US006262865B1

(12) United States Patent
Kazama

(10) Patent No.: US 6,262,865 B1
(45) Date of Patent: Jul. 17, 2001

(54) THIN MAGNETIC HEAD HAVING A COVER PROVIDED ON A PLANAR COIL

(75) Inventor: Toshio Kazama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/328,122

(22) Filed: Jun. 8, 1999

(30) Foreign Application Priority Data

Jun. 9, 1998 (JP) .................................................. 10-160189

(51) Int. Cl.$^7$ ................................. G11B 5/17; G11B 5/60
(52) U.S. Cl. ........................................ 360/123; 360/236.6
(58) Field of Search ...................... 369/13, 300; 360/114, 360/122, 123, 127, 235.2, 235.3, 236.6

(56) References Cited

U.S. PATENT DOCUMENTS

| | | |
|---|---|---|
| 5,402,293 | 3/1995 | Smith . |
| 5,544,131 | 8/1996 | Albertini et al. . |
| 5,615,183 | 3/1997 | Ishii . |
| 5,642,336 | 6/1997 | Albertini et al. . |
| 5,703,839 | 12/1997 | Ishii . |
| 5,703,840 | * 12/1997 | Kazama ................................. 369/13 |
| 5,943,188 | * 8/1999 | Kazama ............................... 360/103 |
| 5,978,320 | * 11/1999 | Nakaoki et al. ........................ 369/13 |
| 6,009,051 | * 12/1999 | Kazama ................................. 369/13 |
| 6,064,632 | * 5/2000 | Nakaoki et al. ........................ 369/13 |

FOREIGN PATENT DOCUMENTS 5-166247 * 7/1993 (JP) .

* cited by examiner

*Primary Examiner*—William Klimowicz
(74) *Attorney, Agent, or Firm*—Brinks Hofer Gilson & Lione

(57) ABSTRACT

A magnetic head in which a pole core is formed on a base, and a planar coil, formed as a thin film coil, winds around the pole core. A cover, formed of a ceramic material or the like, is provided on the base. Using a planar film allows thinner magnetic heads to be produced. Since the planar coil can be brought close to an end of the pole core, a magnetic field can be generated more efficiently, and the recording performance can be improved.

20 Claims, 8 Drawing Sheets

THIN MAGNETIC HEAD HAVING A COVER PROVIDED ON A PLANAR COIL

BACKGROUND OF THE INVENTION

1. Field of the Invention

The present invention relates to a magnetic head provided in, for example, a magneto-optical disk device, and, more particularly, to a magnetic head which is thinner, which can be used to generate a magnetic field more efficiently, etc.

2. Description of the Related Art

FIG. 11 is a partial perspective view of a conventional magneto-optical recording magnetic head (or MO head). FIG. 12 is an exploded perspective view of the core assembly of FIG. 11.

The magnetic head 40 comprises a slider 41 and a core assembly 42. The slider 41 is formed of a nonmagnetic ceramic material, such as calcium titanate ($TiCaO_3$). The bottom surface of the slider 41 is the recording medium facing surface of the slider 41. The top surface of the slider 41 is supported by a supporting member.

As shown in FIG. 12, a center core 43 of the core assembly 42 has a rectangular parallelepiped shape. Sides cores 44 and 44 are substantially L-shaped cores. One end of the center core 43 and one end of each of the side cores 44 are joined by nonmagnetic materials 45 and 45 at a magnetic gap G.

An electrically conductive coil 47 is wound on a bobbin 46 having a through hole 46a extending from the top surface to the bottom surface of the bobbin 46. The center core 43 is inserted into the through hole 46a. A back core 48 is joined to the center core 43 and the side cores 44 and 44, whereby the core assembly 42 is formed.

The magnetic head 40 of FIG. 11 is a floating-type head. As shown in FIG. 11, a flexure 49, being a thin leaf spring member, is bonded to the top surface 41a of the slider 41. The magnetic head is rockably supported at one end of a gimbal through the flexure 49.

As shown in FIG. 12, by winding the electrically conductive coil 47 on the bobbin 46, and inserting the bobbin 46 with the electrically conductive coil 47 wound thereon onto the center core 43, the coil 47 can be very easily installed on the center core 43. However, this method of installing the coil 47 on the center core 43 gives rise to various problems. For example, a thin magnetic head cannot be produced, and it is difficult to increase the efficiency with which a magnetic field is generated.

As shown in FIG. 12, in order to install the electrically conductive coil 47 onto the center core 43, the height h1 of the bobbin 46 on which the coil 47 is wound needs to be at least equal to the length of the center core 43 received by the hole 46a. In addition, when the length, or the like, of the nonmagnetic materials 45 and 45 provided at one end of the center core 43 is considered, the center core 43 needs to be made long, making it difficult to make the entire magnetic head thin. When the coil 47 is formed of an electrically conductive wire, the number of windings and the winding method varies with heads, so that variations occur in the inductance or other wire properties. Further, in order to increase the efficiency with which the center core 43 supplies a magnetic field to a recording medium, the coil 47 needs to be brought as close as possible to the magnetic gap G. However, the structure of the conventional magnetic head makes it extremely difficult to bring the coil 47 close to the magnetic gap G.

FIG. 13 is a plan view of another conventional magnetic head, as seen from the side thereof opposing the recording medium.

Referring to FIG. 13, reference numeral 50 denotes a plate-shaped core formed of a magnetic material, like the center core 43 and the side cores 44 and 44 of FIG. 12. The recording medium opposing surface of the core has a planar shape, with a coil 51 being directly formed spirally on the opposing surface. The thickness of the magnetic head depends only on the thickness of the core 50 and the thickness of the diametrical portion of the planar coil 51. Therefore, this type of magnetic head is thinner than the magnetic head 40 of FIG. 11. When an alternating current is supplied to the planar coil 51 of the magnetic head of FIG. 13, a magnetic field is generated from a center 52 of the planar coil 51 winding, so that a vertical magnetic field is supplied to a recording medium.

However, since this type of magnetic head does not have a protruding core at a portion thereof where a vertical magnetic field is generated, magnetic field lines generated from the winding center 52 cannot be concentrated, so that the strength of the vertical magnetic field supplied from the winding center 52 to the recording medium becomes very weak. When, in order to strengthen the vertical magnetic field, a large amount of electrical current is supplied to the planar coil 51, heat is produced, so that this type of magnetic head is not a desirable type of magnetic head.

In the magnetic head of FIG. 13, the planar coil 51 is formed directly on the recording medium opposing surface of the plate-shaped core, making it difficult to form the recording medium opposing surface into a floating surface (ABS surface). In addition, when floating capability is reduced and the planar coil 51 is in an exposed state at the recording medium opposing surface cause, for example, dirt to move onto the magnetic head.

SUMMARY OF THE INVENTION

In order to overcome the above-described conventional problems, it is an object of the present invention to provide a magnetic head which, for example, is thin and which allows a magnetic field to be produced with greater efficiency.

To this end, according to one aspect of the present invention, there is provided a magnetic head, comprising:

a core protruding from a base towards a recording medium, the core being formed of a magnetic material;

a planar coil formed spirally on the base, with the core as center;

a cover provided on the planar coil such that an end surface of the protruding core is exposed and such that a surface of the cover is formed in a same plane as the end surface of the protruding core;

wherein an end, or a terminal, of the planar coil is exposed at a side portion of the base or the cover.

In a preferred form, the base may be formed of a magnetic material, and the base and the protruding core may be integrally formed.

According to another aspect of the present invention, there is provided a magnetic head comprising two cores protruding from a base towards a recording medium, the cores being formed of a magnetic material;

a planar coil formed spirally on the base, with the cores as centers;

a cover provided on the planar coil such that an end surface of each protruding core is exposed and such that a surface of the cover is formed in a same plane as the end surface of the protruding cores;

wherein the planar coil is formed around the two cores, with the sectional area of one of the cores being smaller than the sectional area of the other of the cores, and with the winding direction of the portion of the planar coil formed around the small sectional area core and the winding direction of the portion of the planar coil formed around the larger sectional area core being opposite each other.

In a preferred form, the planar coil may be a thin film coil. The thin film coil may be formed so as to have a single layer or a plurality of layers to increase the number of windings.

In another preferred form, the planar coil may be formed directly on the base. In still another preferred form, the planar coil may be formed directly on the back side of the cover.

According to still another aspect of the present invention, there is provided a magnetic head, comprising a core protruding from a base towards a recording medium, the core being formed of a magnetic material;
   a planar coil formed spirally on the base, with the core as center;
   a cover provided on the planar coil such that an end surface of the protruding core is exposed and such that a surface of the cover is formed in a same plane as the end surface of the protruding core;
   wherein an end, or a terminal, of the planar coil is exposed at a side portion of the base or the cover; and
   wherein the planar coil is formed on a flexible base for receiving the protruding core, the flexible base being provided on the base.

In a preferred form, the cover may be formed of a nonmagnetic material.

According to still another aspect of the present invention, there is provided a magnetic head, comprising a core protruding from a base towards a recording medium, the core being formed of a magnetic material;
   a planar coil formed spirally on the base, with the core as center;
   a cover provided on the planar coil such that an end surface of the protruding core is exposed and such that a surface of the cover is formed in a same plane as the end surface of the protruding core;
   wherein an end, or a terminal, of the planar coil is exposed at a side portion of the base or the cover.
   wherein the cover is formed of a magnetic material, and
   wherein a gap is formed between the cover and the protruding core.

In a preferred form, the gap between the cover and the protruding core may be filled with a nonmagnetic material.

In another preferred form, in the magnetic head in which the gap between the cover and the protruding core is filled with a nonmagnetic material, the cover may have a hole for receiving the protruding core.

According to still another aspect of the present invention, there is provided a magnetic head, comprising:
   a core protruding from a base towards a recording medium, the core being formed of a magnetic material;
   a planar coil formed spirally on the base, with the core as center;
   a cover provided on the planar coil such that an end surface of the protruding core is exposed and such that a surface of the cover is formed in a same plane as the end surface of the protruding core;
   wherein the cover has at a side surface thereof a cutout for fitting the protruding core therein;
   wherein when the protruding core is fitted to the cutout, the cover covers a portion of the base located closer to an inner peripheral side of the recording medium than the core, with a portion of the cover located closer to an outer peripheral side of the recording medium than the core being exposed; and
   wherein an end, or a terminal, of the planar coil, formed on the base, is brought to the exposed portion of the base.

According to still another aspect of the present invention, there is provided a magnetic head, comprising:
   a core protruding from a base towards a recording medium, the core being formed of a magnetic material;
   a planar coil formed spirally on the base, with the core as center;
   a cover provided on the planar coil such that an end surface of the protruding core is exposed and such that a surface of the cover is formed in a same plane as the end surface of the protruding core;
   wherein the cover is formed such that an end thereof does not match an end of the base;
   wherein when the protruding core is fitted to a cutout formed in a side surface of the cover, the cover covers a portion of the base located closer to an inner peripheral side of the recording medium than the core, with a portion of the base located closer to an outer peripheral side of the recording medium than the core being exposed; and
   wherein an end, or a terminal, formed on the base, is brought to the back surface of the exposed portion of the cover.

According the present invention, the magnetic head comprises a core (hereinafter referred to as "pole core"), formed of a magnetic material, which protrudes from the recording medium opposing surface of the base; a planar coil formed on the base so as to wind around the pole core; and a cover formed on the planar coil. A surface of the cover is formed in the same plane as an end surface of the pole core, which is in an exposed state.

According to the present invention, it is preferable that the base be formed of a magnetic material, and that the base and the pole core be integrally formed. In addition, it is preferable that the planar coil be formed as a thin film coil by sputtering or the like. Further, it is preferable that the cover be formed of a nonmagnetic material such as glass or a ceramic material.

Since a planar coil is formed on the base, the magnetic head of the present invention is thinner than the conventional magnetic head of FIG. 12 in which a coil is wound upon a bobbin.

When the pole core is made shorter, even thinner magnetic heads can be produced. At the same time, the planar coil can be brought close to an end of the pole core, thereby increasing the efficiency with which a magnetic field is generated, and improving the recording performance of the recording head with respect to the recording medium.

Since ends, or terminals, of the planar coil are placed so as to be exposed at a side surface of the base or cover, the terminals of the coil and an end of a wire, extending from the supporting member, can be easily joined together.

A surface of the cover, corresponding to the recording medium opposing surface thereof, can be formed as a floating (ABS) surface.

The most preferable magnetic head structures are those illustrated in FIGS. 7 and 9. In these structures, cutouts are formed in a side surface of the cover. When the pole core is fitted to its associated cutout, only a portion of the base is covered by the cover, that is, a portion of the base is in an exposed state. These magnetic heads can carry out recording on a portion closer to the outer periphery of the recording medium than conventional magnetic heads. Accordingly, these magnetic heads can carry out recording operations on a wider area of the recording medium which can be subjected to recording operations.

DESCRIPTION OF THE PREFERRED EMBODIMENTS

The magnetic heads of FIGS. 1 to 10, which are described below, are rockably supported from the face thereof opposite to its recording medium opposing surface, by a supporting member. They are used, for example, as magneto-optical recording magnetic heads (MO heads). They are floating-type heads which float by a predetermined distance from a recording medium, and supplies a vertical magnetic field to the recording medium. The energy of laser beams are supplied to the recording medium from below the recording medium, and information carried by a signal is recorded onto the recording medium by magnetic field modulation or light modulation.

Figure 1:
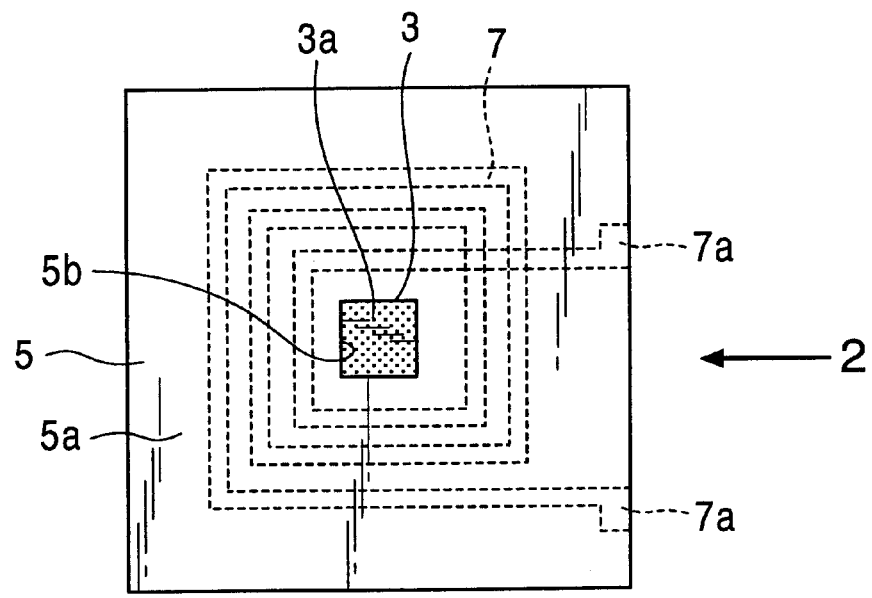
FIG. 1 is a plan view of a first embodiment of the magnetic head in accordance with the present invention, in which its recording medium opposing surface is turned upward.
Figure 2:
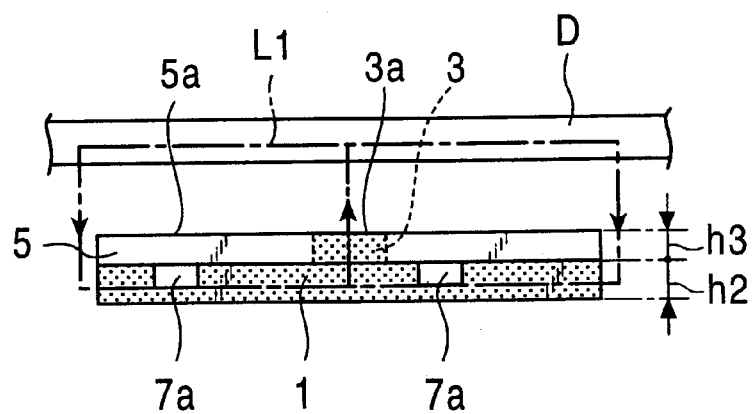
FIG. 2 is a side view of the magnetic head of FIG. 1, as seen from the direction of arrow 2 of FIG. 1.

FIG. 1 is a plan view of a first embodiment of the magnetic head in accordance with the present invention, in which its recording medium opposing surface is turned upward. FIG. 2 is a side view of the magnetic head of FIG. 1, as seen from the direction of arrow 2 of FIG. 1.

Referring to FIG. 2, reference numeral 1 denotes a plate-shaped base formed of a magnetic material such as a ferrite. A core (hereinafter referred to as "pole core") 3 is formed integrally with the base 1 so as to protrude from about the center of the recording medium opposing surface of the base 1. As shown in FIG. 2, the base 1 is formed with a thickness of h2, and the pole core 3 is formed with a length of h3. In the invention, the base 1 may be formed of a nonmagnetic material, such as a ceramic material. In this case, it is preferable that the pole core 3 be formed with a thickness equal to h2+h3, and pass through the base 1, with the lower surface (rear end surface) of the pole core 3 being in an exposed state from the lower surface of the base 1.

A planar coil 7 formed on the base 1 so as to spiral around the pole core 3 as center, as shown in FIG. 1. The planar coil 7 is formed as a thin film coil on the base 1, by sputtering, evaporation, plating, or the like. The thin film may be formed so as to have a single layer or a plurality of layers. The planar coil 7 may be formed of an electrically conductive wire, like conventional coils. In the present invention, when the planar coil 7 is formed as a thin film coil, conventional problems, such as the number of coil windings and winding methods varying with heads, and variations in wire properties such as inductance, are eliminated. Therefore, according to the invention, when magnetic heads are produced, these problems do not arise.

As shown in FIG. 2, a cover 5 is provided on the base 1. They are joined together with an adhesive or the like. The value of the thickness of the cover 5 is substantially the same as the value of the length h3 of the pole core 3. A surface 5a of the cover 5 is formed in the same plane as an end surface 3a of the pole core 3. Therefore, as shown in FIG. 1, the end surface 3a of the pole core 3 is in an exposed state at the surface 5a of the cover 5.

The cover 5 is formed of a nonmagnetic material, such as a ceramic material or glass. A hole 5b for receiving the pole core 3 is formed in the cover 5 so as to extend from the front surface to the back surface of the cover 5. The hole 5b is formed substantially as large as or slightly larger than the pole core 3. When a gap is formed between the pole core 3 and the cover 5, it is preferable to fill the gap with a nonmagnetic material such as glass. The surface 5a of the cover 5 corresponds to the recording medium opposing surface, which can be formed into a floating surface (or ABS surface).

Ends of the planar coil 7 are placed so as to be exposed at a side surface of the base 1, as shown in FIGS. 1 and 2. These ends correspond to terminals 7a. These terminals 7a, which are in an exposed state at a side surface of the base 1, can be easily joined to the ends of a wire extending from the supporting member which supports the magnetic head. Although in FIGS. 1 and 2, the terminals 7a are in an exposed state at a side surface of the base, they may be in an exposed state at a side surface of the cover 5.

When an alternating current is supplied to the planar coil 7 in the magnetic head, a magnetic path L1, represented by an alternate short and long dashed line in FIG. 2, is formed between the pole core 3 and the base 1, in order to supply a vertical magnetic field from the pole core 3 to a recording medium D.

In the magnetic head of the present invention, the pole core 3 allows magnetic field lines, to be supplied to the recording medium D, to be concentrated. When the length h3 of the pole core 3 is made smaller, the planar coil 7 can be brought closer to the end surface 3a of the pole core 3, making it possible to increase the efficiency with which a magnetic field is produced and to improve the recording performance.

Since the planar coil 7 is formed as a thin film coil, the number of coil windings and the coil forming location can be made the same for magnetic heads. When the planar coil 7 is formed, the magnetic head is formed into a thickness equal to the sum of the value of the thickness h2 of the base 1 and the value of the length h3 of the protruding core, so that it is thinner than conventional magnetic heads.

Figure 3:
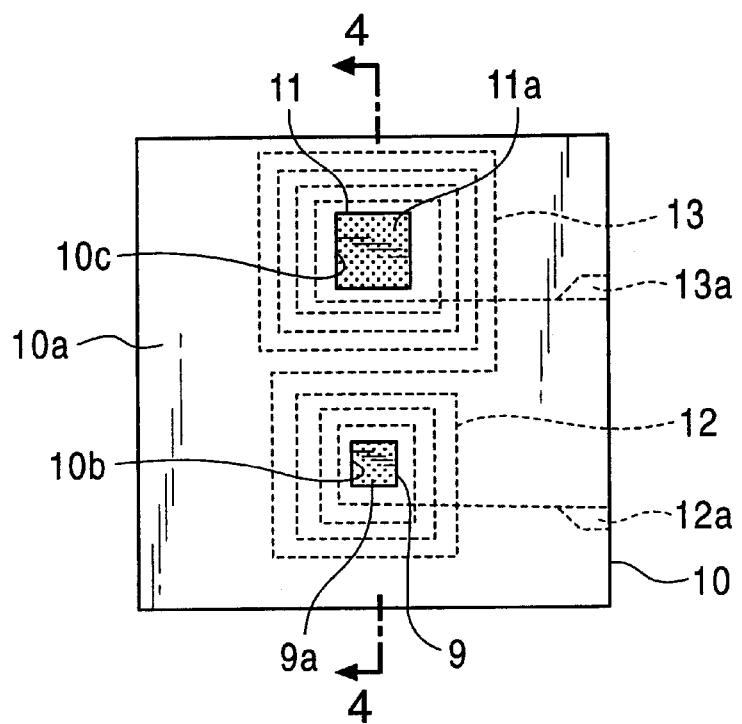
FIG. 3 is a plan view of a second embodiment of the magnetic head in accordance with the present invention, in which its recording medium opposing surface is turned upward.
Figure 4:
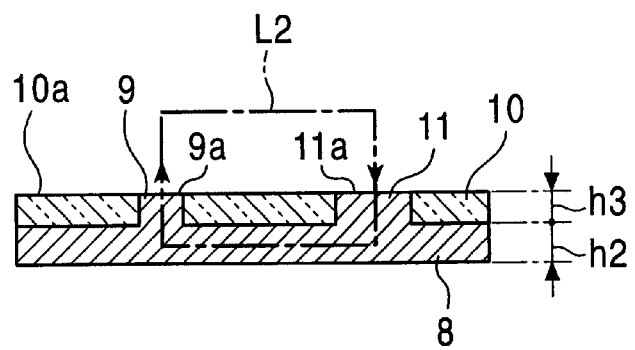
FIG. 4 illustrates the magnetic head of FIG. 3 sectioned by the cutting plane line (or alternate short and long dashed line) of FIG. 3.

FIG. 3 is a plan view of a second embodiment of the magnetic head in accordance with the present invention, in which its recording medium opposing surface is turned upward. FIG. 4 illustrates the magnetic head of FIG. 3 sectioned by the cutting plane line (alternate short and long dashed line) of FIG. 3, as seen from the direction of arrows 4.

As shown in FIGS. 3 and 4, the magnetic head has two cores 9 and 11 protruding from a base 8. The core 9 is hereinafter referred to as "pole core," whereas the core 11 is hereinafter referred to as "auxiliary pole core." The pole core 9 and the auxiliary pole core 11 both have the same length h3, but the sectional area of the pole core 9 is smaller than the sectional area of the auxiliary core 11. As shown in FIG. 3, a planar coil 12, formed spirally around the pole core 9 as center, winds clockwise, whereas a planar coil 13, formed spirally around the auxiliary core 11 as center, winds counterclockwise. Therefore, the planar coils 12 and 13 wind in opposite directions. The planar coils 12 and 13 are formed as thin film coils, by sputtering or the like. The thin films may be formed so as to have a single layer or a plurality of layers. Planar coil 13 does not have to be formed around the auxiliary pole core 11.

Ends of the planar coils 12 and 13 correspond to terminals 12a and 13a, respectively. They are placed so as to be exposed at a side surface of the base 8 or a side surface of a cover 10 to be described later.

As shown in FIGS. 3 and 4, the cover 10, formed of a nonmagnetic material such as a ceramic material, is provided on the base 8. Holes 10b and 10c are formed in the cover 10 for receiving the pole core 9 and the auxiliary pole core 11. The value of the thickness of the cover 10 is substantially the same as the value of the length h3 of the pole core 9 and the auxiliary core 11. When the pole core 9 and the auxiliary pole 11 are inserted respectively into the holes 10b and 10c in the cover 10, a surface 10a of the cover 10, an end surface 9a of the pole core 9, and an end surface 11a of the auxiliary pole core 11 are formed in the same plane. In addition, the end surface 9a of the pole core 9, and the end surface 11a of the auxiliary pole core 11 are in an exposed state from the surface 10a of the cover 10.

As mentioned above, since, in the magnetic head, the direction in which the planar coil 12 winds around the pole core 9 and the direction in which the planar coil 13 winds around the auxiliary pole core 11 are opposite each other, a magnetic path L2, shown in FIG. 4, is formed between the pole core 9 and the auxiliary pole core 11.

Since the sectional area of the pole core 9 is smaller than the sectional area of the auxiliary pole core 11, the magnetic flux density at the pole core 9 is greater than the magnetic flux density at the auxiliary pole core 11. Therefore, the pole core 9 is provided to supply a vertical magnetic field to the recording medium. The auxiliary pole core 11 is provided to help increase the efficiency with which a magnetic field is generated from the pole core 9.

As illustrated in FIG. 4, since the thickness of the magnetic head is equal to the sum of the thickness h2 of the base 8 and the length h3 of the pole core 9 (or the auxiliary pole core 11), the magnetic head is thin. In addition, since the planar coil 12 can be formed close to the end surface 9a of the pole core 9, a magnetic field can be generated more efficiently, and the recording performance can be improved.

In the invention, a plurality of auxiliary pole cores 11 can be formed. In this case, it is necessary to form all of the auxiliary pole cores 11 with a sectional area greater than that of the pole core 9, and for the direction in which the planar coil 13 winds around the auxiliary pole cores 11 to be opposite to the direction in which the planar coil 12 winds around the pole core 9. A planar coil may be provided only around the pole core 9.

Figure 5:
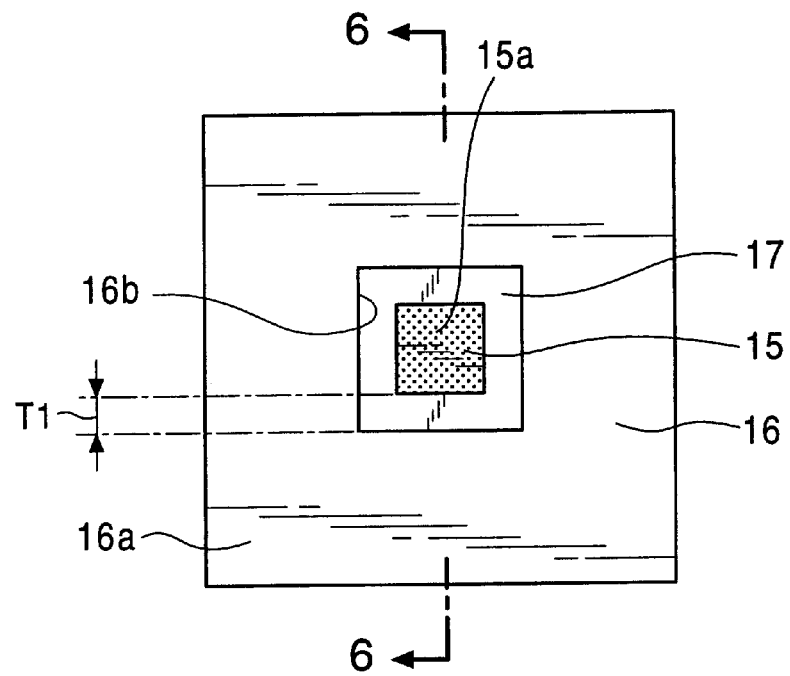
FIG. 5 is a plan view of a third embodiment of the magnetic head in accordance with the present invention, in which its recording medium opposing surface is turned upward.
Figure 6:
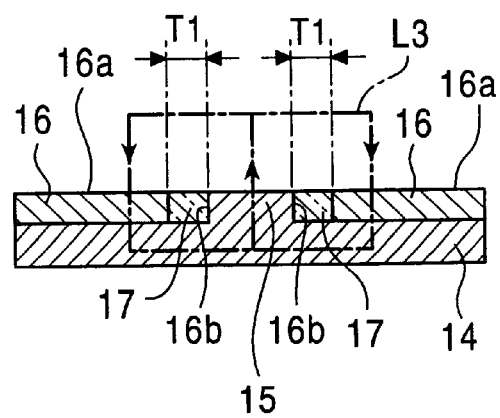
FIG. 6 illustrates the magnetic head of FIG. 5 sectioned by the cutting plane line (or alternate short and long dashed line) of FIG. 5, as seen from the direction of the arrows 6 of FIG. 5.

FIG. 5 is a plan view of a third embodiment of the magnetic head in accordance with the present invention, in which its recording medium opposing surface is turned upward. FIG. 6 is a sectional view of the magnetic head of FIG. 5, as seen from the direction of arrows 6 of FIG. 5.

In FIG. 6, reference numeral 14 denotes a base formed of a magnetic material. A core (hereinafter referred to as "pole core") 15 is formed integrally with the base 14 so as to protrude from about the center of the recording medium opposing surface of the base 14. As in the magnetic head of FIGS. 1 and 3, a planar coil (not shown) is formed as a thin film coil around the pole core 15. The thin film may be formed so as to have a single layer or a plurality of layers.

Like the base 14 and the pole core 15, the cover 16 is formed of a magnetic material such as a ferrite. As shown in FIGS. 5 and 6, a hole 16b is formed in the cover 16. The sectional area of the hole 16b is larger than the sectional area of the pole core 15. When the pole core 15 is inserted into the hole 16b, a gap with a size T1 is formed between the cover 16 and the pole core 15. This gap is filled with a nonmagnetic material 17 such as glass or a resin. An end surface 15a of the pole core 15, a surface 16a of the cover 16, and a surface of the nonmagnetic material 17 are formed in the same plane. It is to be noted that the gap does not have to be filled with the nonmagnetic material 17.

A magnetic path L3, shown in FIG. 6, is formed between the pole core 15 and the cover 16. A vertical magnetic field is supplied from the end 15a of the pole core 15 to the recording medium. In the invention, the smaller the gap size T1 between the cover 16 and the pole core 15, the greater the efficiency with which a magnetic field is generated, making it possible to improve the recording performance. The surface 16a of the cover 16 of FIG. 5 may be formed into a floating surface (ABS surface).

Figure 7:
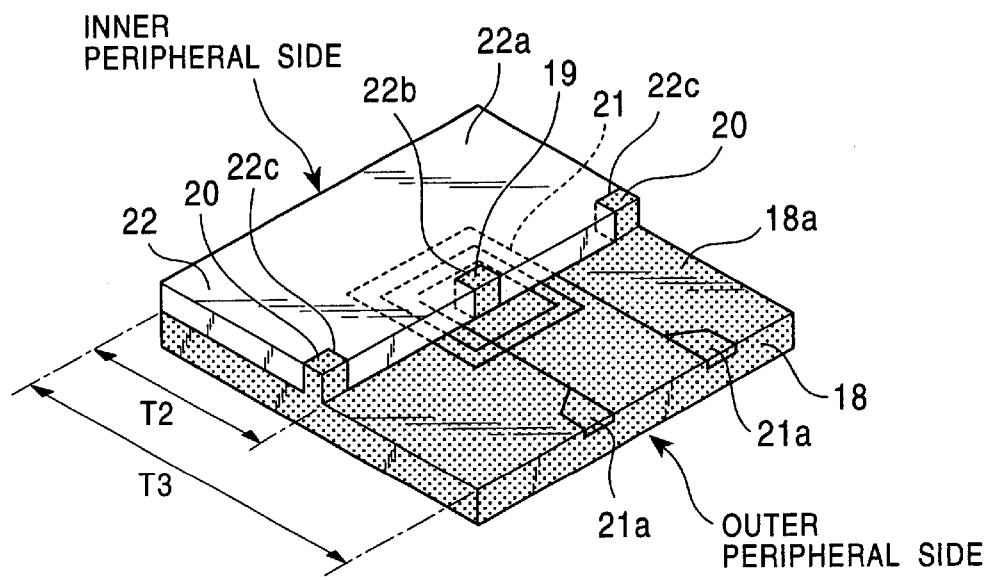
FIG. 7 Is a perspective view of a fourth embodiment of the magnetic head in accordance with the present invention, in which its recording medium opposing surface is turned upward.
Figure 8:
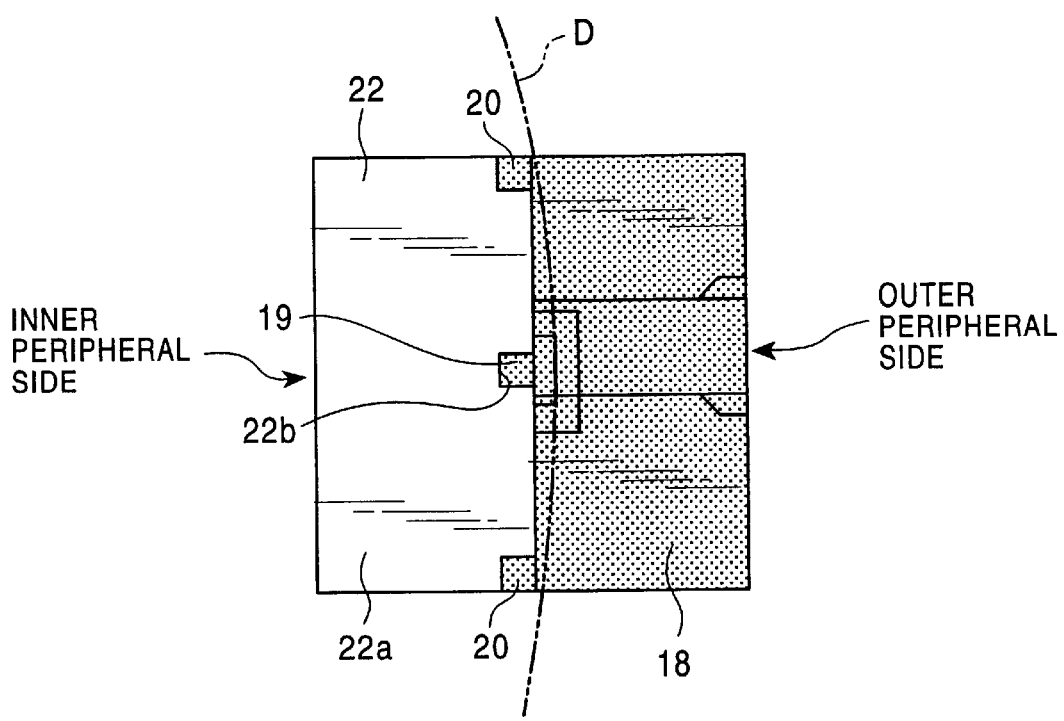
FIG. 8 is a plan view of the magnetic head of FIG. 7.

FIG. 7 is a perspective view of a fourth embodiment of the magnetic head in accordance with the present invention, in which its magnetic head opposing surface is turned upward. FIG. 8 is a plan view of FIG. 7.

Reference numeral 18 denotes a base formed of a magnetic material such as a ferrite. A core (hereinafter referred to as "pole core") 19 is formed integrally with the base 18 so as to protrude from about the center of the recording medium opposing surface of the base 18. In the embodiment, when the magnetic head floats above the recording medium, the left side end of the base 18 is positioned at the inner peripheral side of the recording medium, while the right side end of the base 18 is positioned at the outer peripheral side of the recording medium.

A planar coil 21, formed as a thin film coil so as to have a single layer or layers, winds around the pole core 19. Ends, corresponding to terminals 21a and 21a, of the planar coil 21 are formed at a side surface of the base 18.

Like the covers of FIGS. 1 and 3, the cover 22 used in the fourth embodiment is formed of a nonmagnetic material such as glass or a ceramic material. The cover 22 is formed with a width equal to the width T2 measured from the left side end of the base 18 to the right side end of the pole core 19. Therefore, it is formed with a width smaller than width T3 of the base 18. It is to be noted that the width of the cover 22 may be larger or smaller than width T2.

As shown in FIG. 7, cutouts 22b, 22c, and 22c are formed in the right end of the cover 22. The pole core 19 and auxiliary pole cores 20 and 20 (which, like the pole core 19, are formed integrally with the base 18 so as to protrude therefrom) are fitted in the cutouts 22b, 22c, and 22c, respectively. Therefore, as shown in FIG. 7, the right side of the base 18 formed beyond the pole core 19 is not covered by the cover 22, so that a portion of the planar coil 21 deposited onto the base 18 is in an exposed state. Terminals 21a and 21a of the planar coil 21 are brought to the exposed portion of the base 18 so as to be exposed at that portion of the base 18.

In the magnetic head, a magnetic path is formed between the pole core 19 and the auxiliary cores 20. The pole core 19 is provided to supply a vertical magnetic field to the recording medium. The surface 22a of the cover 22 may be formed into a floating surface (ABS) surface. The magnetic head can be formed with a thickness equal to the sum of the value of the thickness of the base 18 and the value of the length of the pole core 19, so that the magnetic head is thinner. In addition, a magnetic field can be generated more efficiently, and the recording performance can be improved.

As shown in FIG. 7, only a portion of the base 18 is covered with the cover 18, so that the portion of the base 18 extending from the pole core 19 to the side end of the base 18 at the outer peripheral side of the recording medium is in an exposed state. Such a structure is used to allow the magnetic head to carry out recording operations on a portion further towards the outer periphery of the recording medium.

When the entire recording medium opposing surface of the magnetic head does not extend directly above the recording medium, the magnetic head cannot float, so that the recording medium cannot be subjected to recording operations. To carry out recording operations to a portion further towards the outer periphery of the recording medium, it is necessary for the entire surface 22a of the cover 22 of the magnetic head to be disposed directly above the recording medium, even when the pole core 19, where a vertical magnetic field is generated, is brought closer to the outer periphery of the recording medium. More specifically, as shown in FIG. 8, the cover 22 is provided so as to extend up to a side end of the pole core 19 at the outer peripheral side of the recording medium D. In other words, the cover 22 is provided so as not to extend on the portion of the base 18 extending beyond the side end of the pole core 19, towards the outer peripheral side of the recording medium.

As shown in FIG. 8, by fitting the pole core 19 into the cutout 22b formed in a side end of the cover 19, the entire surface 22a of the cover 22 can be made to oppose the recording medium D, even when the pole core 19 is brought close to the outer periphery of the recording medium D. Therefore, the recording head can carry out recording operations on a wider area of the recording medium D that can be subjected to recording operations.

Figure 9:
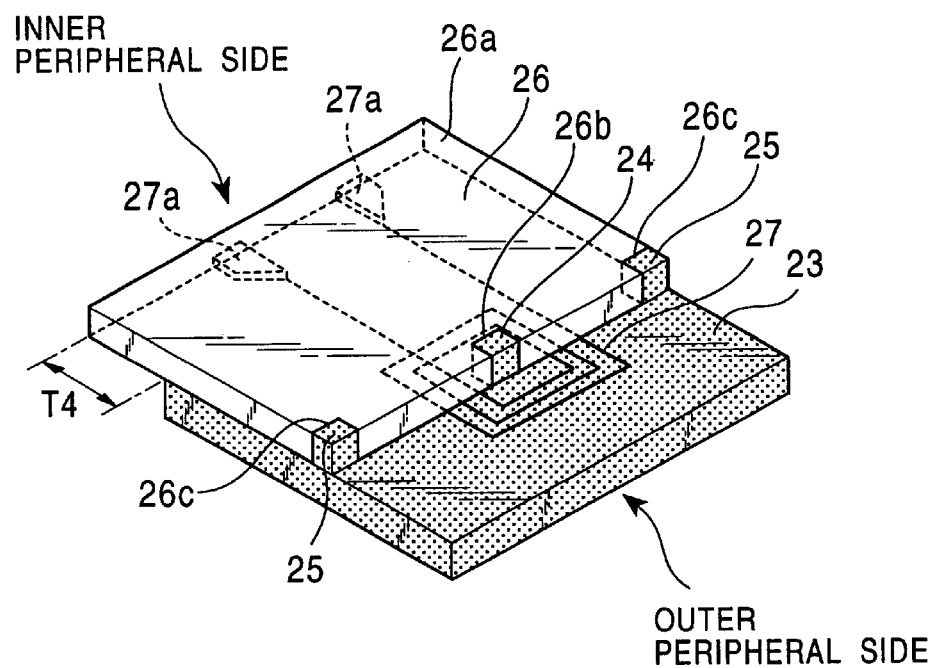
FIG. 9 is a perspective view of a fifth embodiment of the magnetic head in accordance with the present invention, in which its recording medium opposing surface is turned upward.

FIG. 9 is a perspective view of a fifth embodiment of the recording head in accordance with the present invention, in which its recording medium opposing surface is turned upward.

Referring to FIG. 9, reference numeral 23 denotes a base formed of a magnetic material such as a ferrite material. A core (hereinafter referred to as "pole core") 24 is formed integrally with the base 23 so as to protrude from about the center of the recording medium opposing surface of the base 23. As shown in FIG. 9, a thin film planar coil, with a single layer or a plurality of layers, winds around the pole core 24.

Like the magnetic head of FIG. 8, cutouts 26b, 26c, and 26c are formed in the right end (at the outer peripheral side of the recording medium) of the cover 26 formed of a nonmagnetic material. The pole core 24 is fitted into the cutout 26b, and auxiliary pole cores 25 and 25 (projecting from the recording medium surface of the base 23, like the pole core 24) are fitted into the cutouts 26c and 26c. The cover 26 does not extend on the portion of the base 23 extending beyond the pole core 24 and the auxiliary pole cores 25 and 25, towards the outer peripheral side of the recording medium. Therefore, a portion of the thin film planar coil 27 is in an exposed state at the portion of the base 23 extending beyond the pole core 24, towards the outer peripheral side of the recording medium.

In the magnetic head of FIG. 9, the cover 26 protrudes beyond the left end of the base 23, towards the inner peripheral side of the recording medium. The protruding portion of the cover 26 has a width T4. Ends, corresponding to terminals 27a and 27a, of the planar coil 27, formed on the base 23, extend towards the inner side of the recording medium so as to be exposed at the back surface of the protruding portion of the cover 26.

Similarly with the magnetic head of FIG. 7, the pole core 24, used to supply a vertical magnetic field to the recording medium, can be brought closer to the outer periphery of the recording medium. Therefore, the magnetic head of FIG. 9 can perform recording operations on a wider area of the recording medium which can be subjected to recording operations. In addition, the magnetic head of FIG. 9 is thinner, and allows a magnetic field to be generated more efficiently.

Features of the magnetic head of FIG. 9 is that a portion of the cover 26 is formed so as to extend beyond the base 23, and that the terminals 27a and 27a are formed at the back side of the protruding portion of the cover 26.

Figure 10:
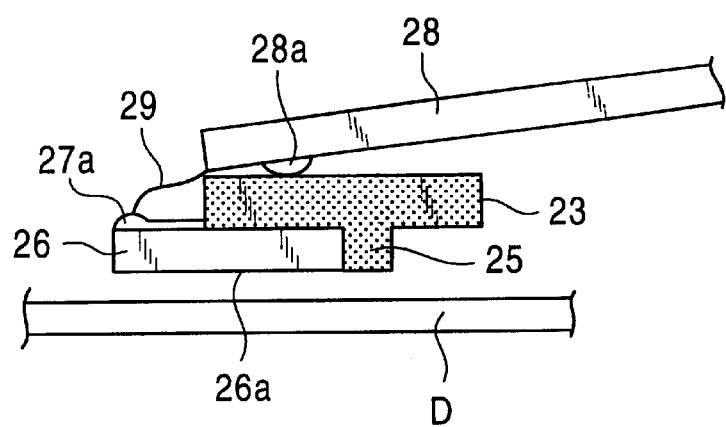
FIG. 10 is a side view of the magnetic head of FIG. 9 mounted to a supporting member.
Figure 11:
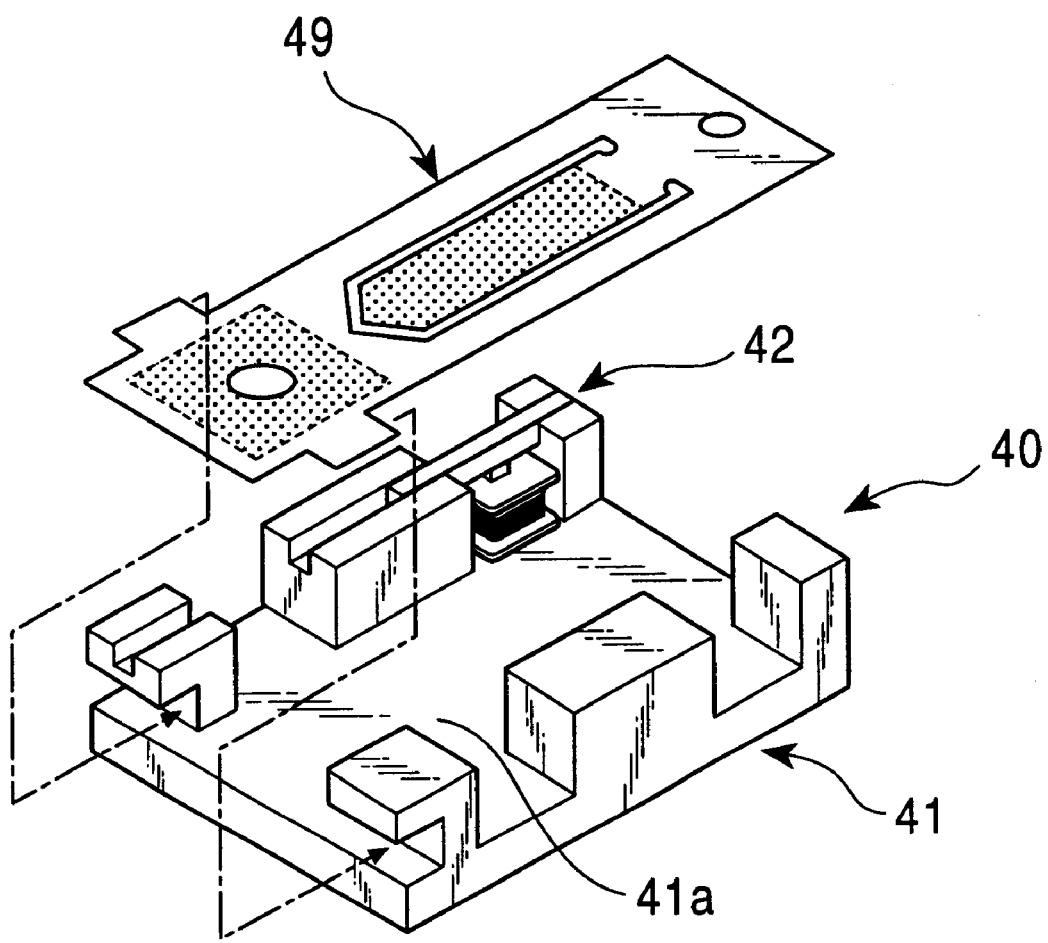
FIG. 11 is a partial perspective view of a conventional magnetic head.
Figure 12:
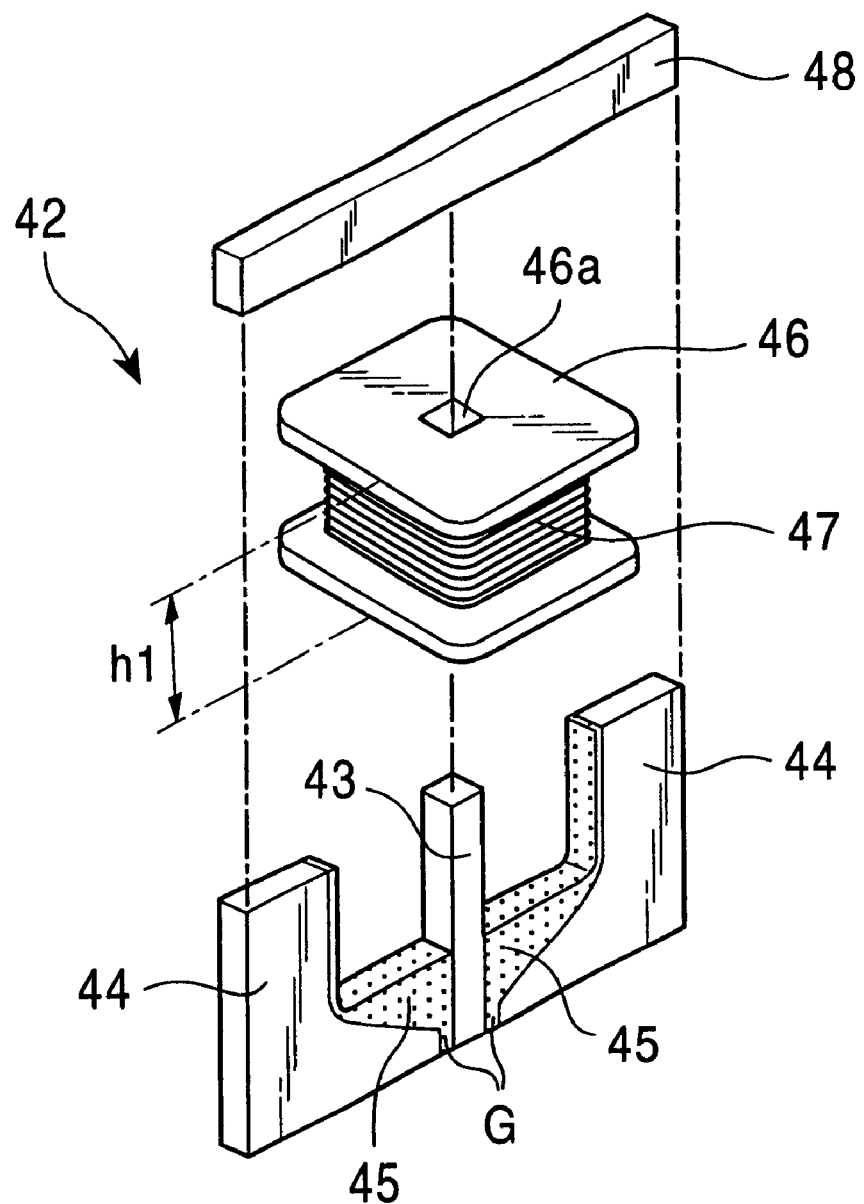
FIG. 12 is an exploded perspective view of the core assembly of FIG. 11.
Figure 13:
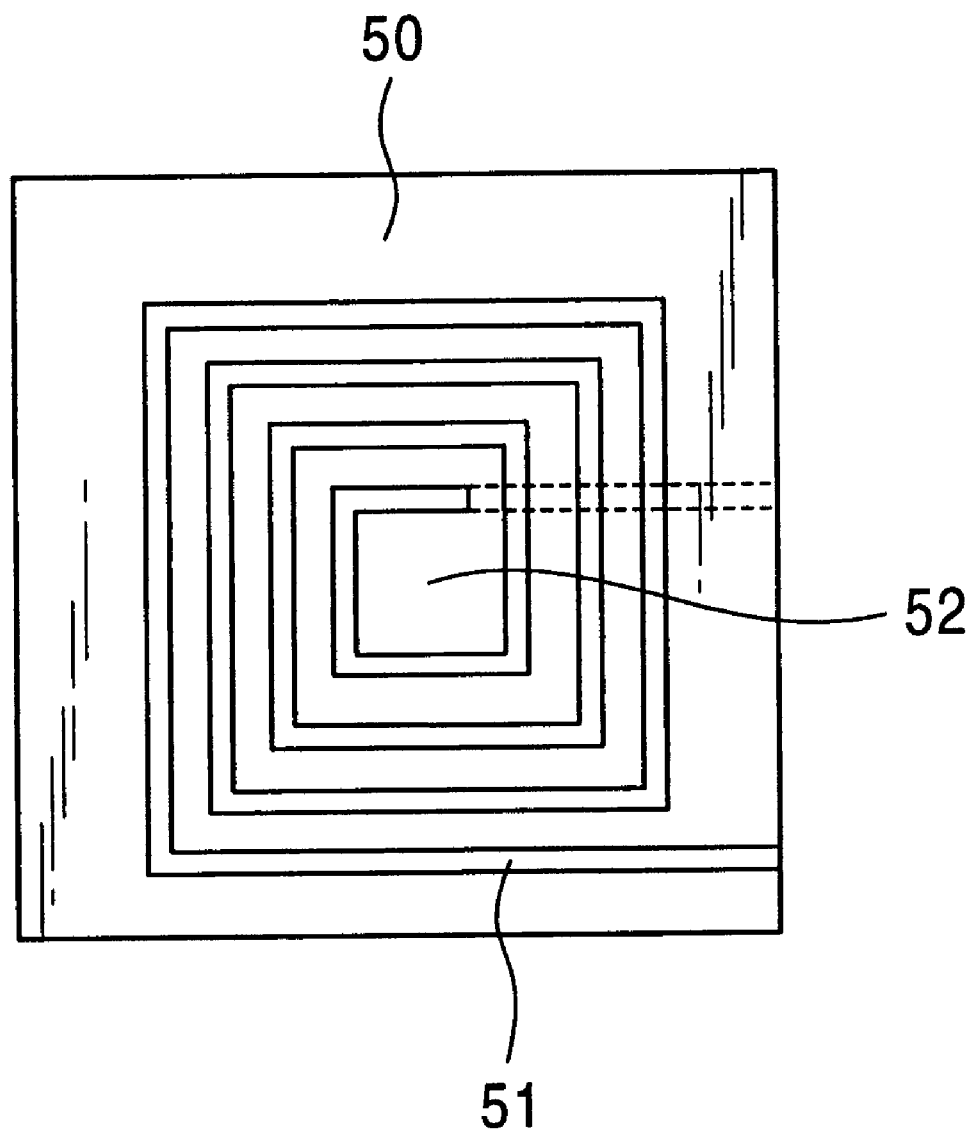
FIG. 13 is a plan view of another conventional magnetic head, in which its recording medium opposing surface is turned upward.

FIG. 10 is a side view of the magnetic head of FIG. 9 mounted to a supporting member.

The magnetic head of FIG. 9 is turned upside down, and, as shown in FIG. 10, a supporting member 28, with a pivot 28a, is mounted onto the base 23 of the magnetic head. Here, the pivot 28a must be positioned at the center of gravity of the magnetic head. By placing the terminals 27a and 27a of the planar coil 27 at a portion of the cover 26 extending beyond the base 26, the terminals 27a and 27a, as shown in FIG. 10, can be made to face the direction where the supporting member 28 is provided. Accordingly, the terminals 27a and 27a can be easily joined to a terminal of a wire 29 provided at the supporting member 28, by bonding using a gold bump. Since, in the magnetic head of FIG. 7, the terminals 27a are in an exposed state at the recording medium opposing surface of the base 18, wire joining operations become slightly complicated in the magnetic head of FIG. 7 than in the magnetic head of FIG. 9.

In the above-described invention, since a thin film planar coil is formed so as to wind around a protruding core or cores, the magnetic head is thinner. In addition, since the planar coil can be brought close to an end surface of a core or cores, a magnetic field can be generated more efficiently, thereby improving the recording performance. Further, since a cover is provided at a side of the head facing the recording medium, a cover surface can be formed as a floating surface (ABS surface), so that the magnetic head can float stably. Still further, since ends, or terminals, of the planar coil are in an exposed state at a side surface of the base or the cover, the terminals and a wire, extending from the supporting member, can be easily joined together.

According to the invention, the most preferable magnetic head structures are those illustrated in FIGS. 7 and 9. When the magnetic head of FIG. 7 or FIG. 9 is used, recording operations can be performed to a portion further towards the outer peripheral side of the recording medium. Therefore, the magnetic head can carry out recording operations on a wider area of the recording medium which can be subjected to recording operations.

In addition to being applicable to a floating type head, the present invention can be applied to a sliding type magnetic head, or a magnetic head incorporated in, for example, a hard disk device or a minidisk (MD) device.

Although the magnetic head cover illustrated in FIGS. 1, 3, 7, and 9 are formed of, for example, a ceramic material, they may also be molded out of a resin.

Although the planar coil of the magnetic heads of FIGS. 1, 3, 7, and 9 are thin film coils, or formed of electrically conductive wires (as with conventional coils), they may be formed as thin film coils on a flexible base, which is interposed between the base and the cover.

As can be understood from the foregoing description, since a protruding core is formed on the base, and a planar coil or cores formed as a thin film coil or coils so as to wind around the core or cores, a thinner magnetic head can be produced. In addition, since the planar coil can be brought close to an end surface of the core or cores, a magnetic field can be generated more efficiently, resulting in improved the recording performance. Further, since the planar coil is formed as a thin film coil, coil properties, such as inductance, can be maintained.

A cover, formed of a nonmagnetic material such as a ceramic material, is provided on the base, so that a cover surface can be easily formed into a floating surface (ABS surface).

Ends, or terminals, of the planar coil are in an exposed state at a side surface of the base or the cover, making it easier to join the terminals to a wire extending from the supporting member.

Since the cover is formed so as to extend on a portion of the base extending from the inner peripheral side of the recording medium to where the core or cores are formed, recording operations can be carried out on a portion further towards the outer periphery of the recording medium. Therefore, the magnetic head can perform recording operations on a wider area of the recording medium which can be subjected to recording operations.

What is claimed is:

1. A magnetic head, comprising:
    a core protruding from a base towards a recording medium, the core being formed of a magnetic material;
    a planar coil formed spirally on the base, with the core as center;
    a cover provided on the planar coil such that an end surface of the protruding core is exposed and such that a surface of the cover is formed in a same plane as the end surface of the protruding core;
    wherein the cover has at a side surface thereof a cutout for fitting the protruding core therein;
    wherein when the protruding core is fitted to the cutout, the cover covers a portion of the base located closer to an inner peripheral side of the recording medium than the core, with a portion of the base located closer to an outer peripheral side of the recording medium than the core being exposed; and
    wherein an end, or a terminal, of the planar coil is exposed at a side portion of the base or the cover.

2. A magnetic head according to claim 1, wherein the planar coil is a thin film coil.

3. A magnetic head according to claim 2, wherein the cover is formed of a nonmagnetic material.

4. A magnetic head according to claim 3, wherein the cover has a hole for receiving the protruding core.

5. A magnetic head according to claim 1, wherein the planar coil is formed directly on the base.

6. A magnetic head according to claim 5, wherein the cover is formed of a nonmagnetic material.

7. A magnetic head according to claim 6, wherein the cover has a hole for receiving the protruding core.

8. A magnetic head according to claim 1, wherein the planar coil is formed directly on the back surface of the cover.

9. A magnetic head according to claim 8, wherein the cover is formed of a nonmagnetic material.

10. A magnetic head according to claim 9, wherein the cover has a hole for receiving the protruding core.

11. A magnetic head according to claim 1,
    wherein the cover is formed such that an end thereof does not match an end of the base;
    wherein an end, or a terminal, formed on the base, is brought to the back surface of the exposed portion of the cover.

12. A magnetic head according to claim 11, wherein the planar coil is a thin film coil.

13. A magnetic head according to claim 12, wherein the cover is formed of a nonmagnetic material.

14. A magnetic head according to claim 13, wherein the cover has a hole for receiving the protruding core.

15. A magnetic head according to claim 11, wherein the planar coil is formed directly on the base.

16. A magnetic head according to claim 15, wherein the cover is formed of a nonmagnetic material.

17. A magnetic head according to claim 16, wherein the cover has a hole for receiving the protruding core.

18. A magnetic head according to claim 11, wherein the planar coil is formed directly on the back surface of the cover.

19. A magnetic head according to claim 18, wherein the cover is formed of a nonmagnetic material.

20. A magnetic head according to claim 19, wherein the cover has a hole for receiving the protruding core.

* * * * *

UNITED STATES PATENT AND TRADEMARK OFFICE
CERTIFICATE OF CORRECTION

PATENT NO. : 6,262,865 B1
DATED : July 17, 2001
INVENTOR(S) : Toshio Kazama

It is certified that error appears in the above-identified patent and that said Letters Patent is hereby corrected as shown below:

Claim 11,
Line 3, after "base;" insert -- and --.

Signed and Sealed this

Sixteenth Day of April, 2002

JAMES E. ROGAN
Director of the United States Patent and Trademark Office